US012194738B2

(12) United States Patent
Takahashi

(10) Patent No.: US 12,194,738 B2
(45) Date of Patent: Jan. 14, 2025

(54) THERMAL PRINTER

(71) Applicant: Seiko Instruments Inc., Chiba (JP)

(72) Inventor: Masanori Takahashi, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 192 days.

(21) Appl. No.: 18/168,222

(22) Filed: Feb. 13, 2023

(65) Prior Publication Data

US 2023/0256756 A1 Aug. 17, 2023

(30) Foreign Application Priority Data

Feb. 16, 2022 (JP) ................................ 2022-021724

(51) Int. Cl.
*B41J 11/70* (2006.01)
*B41J 3/407* (2006.01)

(52) U.S. Cl.
CPC ............. *B41J 11/70* (2013.01); *B41J 3/4075* (2013.01)

(58) Field of Classification Search
CPC ........ B41J 11/70; B41J 3/4075; B41J 11/703; B41J 2/32; B26D 1/0006; B26D 2001/0053; B26D 2001/006; B26D 1/065; B26D 2001/0066; B26D 1/08; B26D 7/18; B65H 35/06
See application file for complete search history.

(56) References Cited

U.S. PATENT DOCUMENTS

2010/0086340 A1* 4/2010 Takami .................. B41J 3/4075 400/621

FOREIGN PATENT DOCUMENTS

JP 2003-211756 A 7/2003
JP 2016-209999 A 12/2016

OTHER PUBLICATIONS

Extended European Search Report in Europe Application No. 23155986.5, dated Jun. 9, 2023, 7 pages.

* cited by examiner

*Primary Examiner* — Lisa Solomon
(74) *Attorney, Agent, or Firm* — Crowell & Moring LLP

(57) ABSTRACT

A thermal printer configured to perform printing on a linerless label including an adhesive surface formed on a back surface of the linerless label, the thermal printer comprising a cutter unit that includes: a fixed blade provided on the back surface side of the linerless label; and a movable blade configured to reciprocate between a first position at which the movable blade is opposed to the fixed blade through intermediation of the linerless label, and a second position at which at least a part of the movable blade overlaps the fixed blade and the movable blade forms a cut in the linerless label, wherein the movable blade includes: a first blade edge configured to form the cut in the linerless label; and a groove, which has an edge, and is formed in a sliding surface configured to slide on the fixed blade when the movable blade is at the second position, and wherein the edge includes: an adhesive blocking edge portion formed on the sliding surface along an advancing direction; and an adhesive scraping edge portion formed on the sliding surface so as to cross the advancing direction.

8 Claims, 6 Drawing Sheets

THERMAL PRINTER

RELATED APPLICATIONS

This application claims priority to Japanese Patent Application No. 2022-021724, filed on Feb. 16, 2022, the entire content of which is incorporated herein by reference.

BACKGROUND OF THE INVENTION

1. Field of the Invention

The present invention relates to a thermal printer.

2. Description of the Related Art

Hitherto, there has been known a thermal printer that operates as follows. Under a state in which a recording sheet is sandwiched between a platen roller and a thermal head, the platen roller is rotated, and thus printing is performed by the thermal head on a print surface of the recording sheet while the recording sheet is conveyed. Incidentally, in order to reduce environmental loads and improve convenience, for labels such as POS labels on food and various display labels, a so-called linerless label is used as a recording sheet in some cases. The linerless label is a recording sheet without a liner configured to cover an adhesive for adhesion formed on a surface opposite to a print surface of the recording sheet. At the time of cutting, the adhesive adheres to a fixed blade and a movable blade for performing cutting, and such adhesion results in causing a load during the cutting. In this context, there has been known a printer having a configuration in which a groove is formed along a blade edge of a fixed blade or a movable blade to allow the adhesive to drop into the groove. In the groove formed in parallel to and along the blade edge of the fixed blade or the movable blade, the adhesive accumulates in a part of the groove. Thus, there has been devised a printer having a configuration in which a housing includes a cutout portion through which a blade edge portion is accessible from an outside so that the blade edge can be cleaned (see, for example, Japanese Patent Application Laid-open No. 2003-211756).

However, in the printer described in Japanese Patent Application Laid-open No. 2003-211756, it is required to periodically clean the blade edge. When a housing lid portion (openable and closable cover portion) is opened for, for example, cleaning, the fixed blade and the movable blade mounted to the housing lid portion are exposed. Thus, touching the fixed blade or the movable blade may cause injury. Further, a user is required to manage to visually check the adhesive accumulating on the blade edge and clean the blade edge at suitable timing, which brings difficulty in maintenance work.

The present invention has been made in view of the above-mentioned circumstances, and has an object to lessen a burden of maintenance, for example, to reduce the adhesive removal work by efficiently accumulating an adhesive in a groove formed in a blade until the printer reaches the end of its lifetime.

SUMMARY OF THE INVENTION

According to one embodiment of the present invention, there is provided a thermal printer configured to perform printing on a linerless label including an adhesive surface formed on a back surface of the linerless label, the thermal printer comprising a cutter unit that includes: a fixed blade provided on the back surface side of the linerless label; and a movable blade configured to reciprocate between a first position at which the movable blade is opposed to the fixed blade through intermediation of the linerless label, and a second position at which at least a part of the movable blade overlaps the fixed blade and the movable blade forms a cut in the linerless label, wherein the movable blade includes: a first blade edge configured to form the cut in the linerless label; and a groove, which has an edge, and is formed in a sliding surface configured to slide on the fixed blade when the movable blade is at the second position, and wherein the edge includes: an adhesive blocking edge portion formed on the sliding surface along an advancing direction; and an adhesive scraping edge portion formed on the sliding surface so as to cross the advancing direction.

In the above-mentioned thermal printer according to the one embodiment of the present invention, wherein the first blade edge is formed on the second position side in the advancing direction, and is formed into a V shape extending toward a center portion of the movable blade.

In the above-mentioned thermal printer according to the one embodiment of the present invention, wherein the adhesive blocking edge portion comprises at least three adhesive blocking edge portions formed in the groove.

In the above-mentioned thermal printer according to the one embodiment of the present invention, wherein the adhesive scraping edge portion of the groove is formed on the sliding surface so as to be parallel to the first blade edge.

In the above-mentioned thermal printer according to the one embodiment of the present invention, wherein the adhesive scraping edge portion of the groove is formed on the sliding surface so as to cross the advancing direction.

In the above-mentioned thermal printer according to the one embodiment of the present invention, wherein the movable blade includes at least one groove formed in the sliding surface, and wherein the groove is arranged in a line-symmetrical manner about a symmetry axis parallel to the advancing direction.

In the above-mentioned thermal printer according to the one embodiment of the present invention, wherein the movable blade includes a plurality of grooves formed in the sliding surface, and wherein the plurality of grooves adjacent to each other are arranged so as to overlap each other in the advancing direction.

In the above-mentioned thermal printer according to the one embodiment of the present invention, wherein in a region of the sliding surface, which is defined by a width of the linerless label, at least one groove is formed across an entire region of the sliding surface in a width direction perpendicular to the advancing direction.

DETAILED DESCRIPTION OF THE PREFERRED EMBODIMENTS

An embodiment of the present invention is described with reference to the FIG. 1 to FIG. 4. In the embodiment and modification examples described below, corresponding configurations are denoted by the same reference symbols, and description thereof is omitted in some cases. In the following description, expressions such as “parallel”, “orthogonal”, “center”, and “coaxial”, which express relative or absolute arrangement, not only represent such arrangement in the strict sense of the word, but also represent a relatively displaced state with an angle or a distance that falls within tolerance or achieves the same function.

[Thermal Printer 1]

Figure 1:
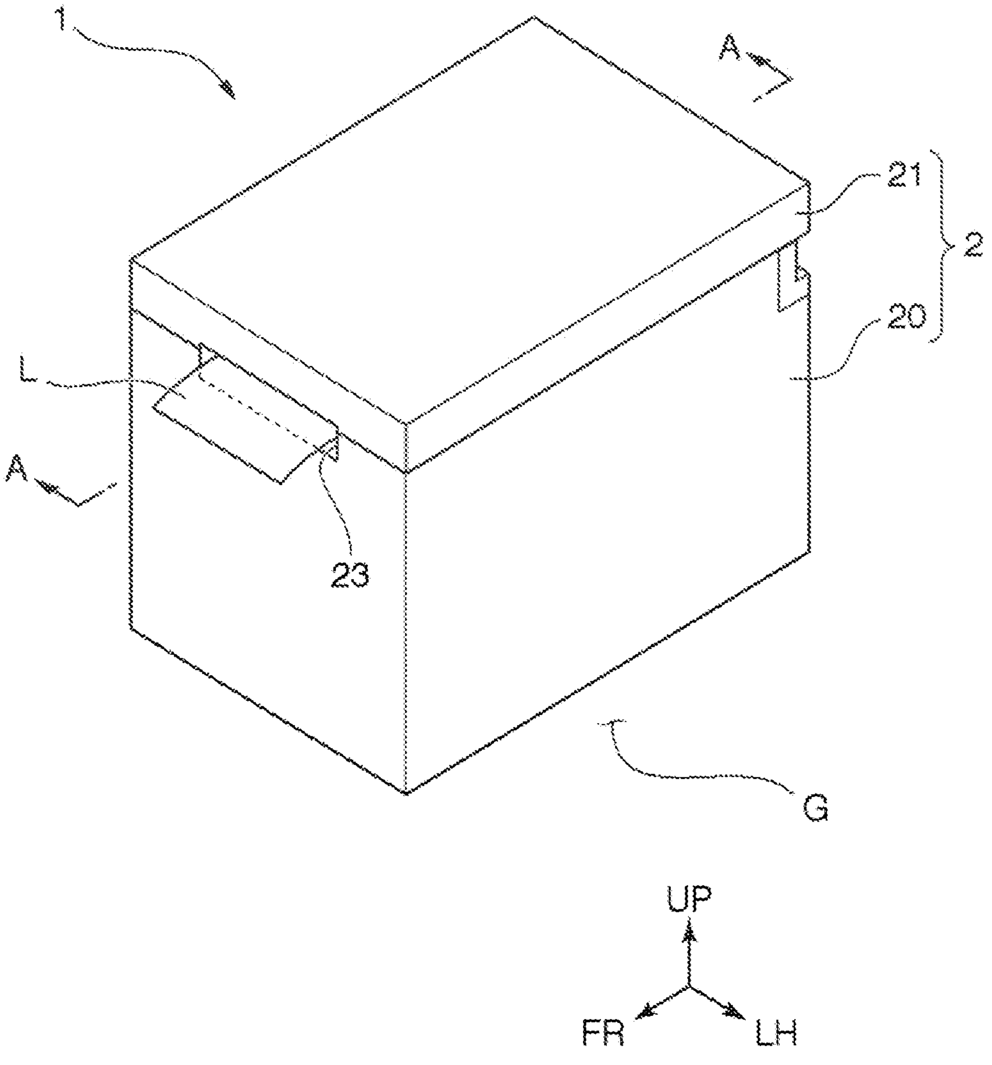
FIG. 1 is a perspective view for illustrating a thermal printer according to one embodiment of the present invention.
Figure 2:
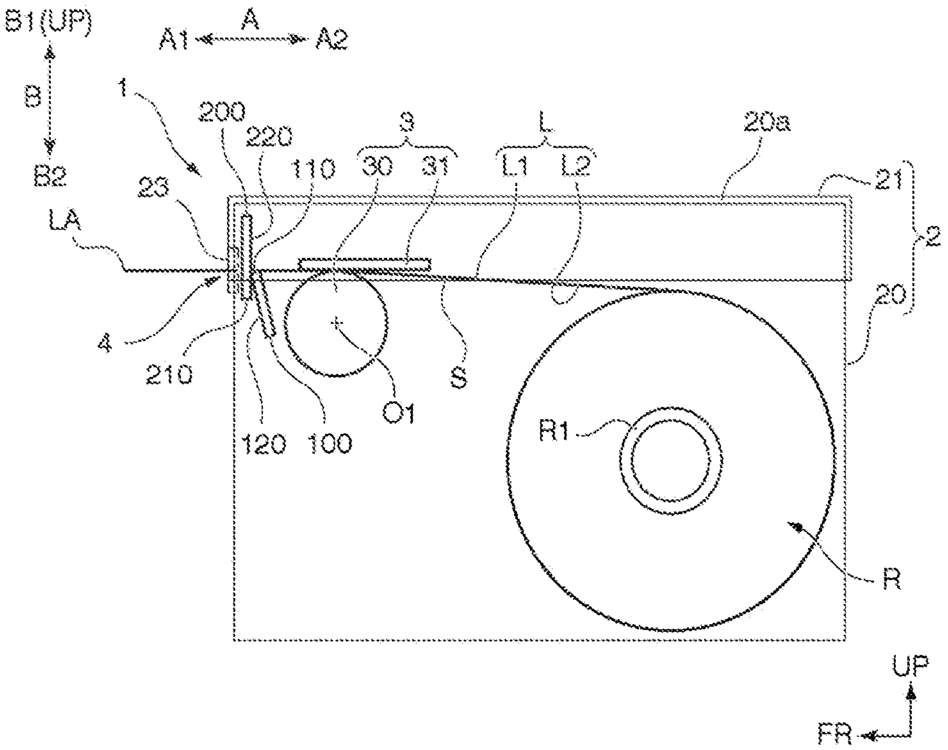
FIG. 2 is a side sectional view for illustrating an internal configuration of the thermal printer taken along the line A-A of FIG. 1.

FIG. 1 is a perspective view for illustrating a thermal printer 1. Further, FIG. 2 is a side sectional view for illustrating an internal configuration of the thermal printer 1 taken along the line A-A of FIG. 1. As illustrated in FIG. 1 or FIG. 2, the thermal printer 1 includes a casing 2, a printing unit 3, a cutter unit 4, and a linerless label L. The thermal printer 1 is placed on a placement surface G. In the following description of the casing 2 and the printing unit 3, a direction perpendicular to the placement surface G is referred to as an up-and-down direction (the arrow “UP” indicates an upper side), and two directions orthogonal to the up-and-down direction are referred to as a front-and-rear direction (the arrow “FR” indicates a front side) and a right-and-left direction (the arrow “LH” indicates a left side).

[Casing 2]

The casing 2 is formed into a box shape. Specifically, the casing 2 includes a housing 20 and an upper cover 21.

The housing 20 is formed into a box shape having an upper-end opening portion 20*a* formed in an upper part thereof, and is placed on the placement surface G. The housing 20 has such a size as to be capable of accommodating therein a platen roller 30 of the printing unit 3 described later, the cutter unit 4, and the linerless label L.

The upper cover 21 opens and closes the upper-end opening portion 20*a* of the housing 20. Specifically, the upper cover 21 is formed into a box shape opened downward, and has the same shape as that of the housing 20 in plan view. In a closing position, the upper cover 21 is superposed on the housing 20 from above, and closes the upper-end opening portion 20*a* of the housing 20. Further, in this state, a delivery slot 23 is defined between the housing 20 and the upper cover 21. The delivery slot 23 allows communication between an inside and an outside of the casing 2, and has a slit shape extending in the right-and-left direction. Through the delivery slot 23, the linerless label L having been subjected to printing by the printing unit 3 is delivered toward a front side of the thermal printer. Meanwhile, in an opening position, the upper cover 21 retreats from an upper side of the housing 20, and opens the upper-end opening portion 20*a* of the housing 20.

[Printing Unit 3]

As illustrated in FIG. 2, the printing unit 3 includes the platen roller 30 and a thermal head 31.

The platen roller 30 is a rubber roller extending in the right-and-left direction. The platen roller 30 is provided at a front end portion (portion located closer to the delivery slot 23) inside the housing 20. The platen roller 30 is rotatable about an axis O1 extending along the right-and-left direction, and is rotated in accordance with a driving force of a driving motor (not shown) during conveyance of the linerless label L.

The thermal head 31 is provided at a portion located closer to the delivery slot 23 inside the upper cover 21. The thermal head 31 includes a plurality of heating elements linearly arrayed along the right-and-left direction. The thermal head 31 is fixed to a front end portion of the upper cover 21 under a state in which the heating elements face downward.

The platen roller 30 and the thermal head 31 are opposed to each other in the up-and-down direction through intermediation of the linerless label L. When the upper cover 21 is in the closing position, the thermal head 31 is held in close contact with the platen roller 30. The linerless label L is caused to pass between the platen roller 30 and the thermal head 31 along with rotation of the platen roller 30. A heating pattern of the heating elements of the thermal head 31 is controlled based on a signal output from a control board (not shown). Transfer of heat from the heating elements to a print surface L1 of the linerless label L allows information (such as characters and figures) associated with the heating pattern to e printed on the print surface L1.

[Cutter Unit 4]

As illustrated in FIG. 2, the cutter unit 4 includes a fixed blade 100, a movable blade 200, and a moving mechanism (not shown). The cutter unit 4 causes the movable blade 200 to reciprocate with respect to the linerless label L with the moving mechanism (not shown), and sandwiches the linerless label L between the movable blade 200 and the fixed blade 100, to thereby form a cut in the linerless label L.

In the following description of the cutter unit 4 and the linerless label L, a direction of conveying the linerless label L is referred to as a conveying direction A. In the conveying direction A, a side to which the linerless label L is conveyed is referred to as a conveyance destination side (downstream side) A1, and a side opposite to the conveyance destination side A1 is referred to as a conveyance origin side (upstream side) A2. Further, a direction in which the movable blade 200 advances so that the fixed blade 100 and the movable blade 200 cut the linerless label L is referred to as an advancing direction B. The advancing direction B is orthogonal to the conveying direction A. In the advancing direction B, a side to which the movable blade 200 is separated away from the fixed blade 100 is referred to as a separation side B1, and a side to which the movable blade 200 is brought close to the fixed blade 100 so as to form a cut in the linerless label L is referred to as a cutting side B2. Moreover, a sheet width direction of the linerless label L orthogonal to the conveying direction A and the advancing direction B is referred to as a width direction C.

In this embodiment, the conveying direction A substantially matches the front-and-rear direction. The advancing direction B substantially matches the up-and-down direction. Further, the width direction C substantially matches the right-and-left direction. However, it is not always required that the conveying direction A match the front-and-rear direction. It is not always required that the advancing direction B match the up-and-down direction. Further, it is not always required that the width direction C match the right-and-left direction.

The fixed blade 100 is arranged between the platen roller 30 and the delivery slot 23 in the housing 20 and on a pressure-sensitive adhesive surface L2 side of the linerless label L being a back surface of the linerless label L. The fixed blade 100 is formed into a plate-like shape extending in the width direction C. The fixed blade 100 is fixed through predetermined means by a support portion (not shown) provided in the housing 20. Further, the fixed blade 100 includes a second blade edge 110 and a fixed-blade back concave surface 120.

The second blade edge 110 is a blade edge of the fixed blade 100 provided on the separation side B1 in the advancing direction B. The fixed-blade back concave surface 120 is a flat surface provided on the conveyance destination side A1 in the conveying direction A, and is a surface that is opposed to the movable blade 200 in the conveying direction A when the fixed blade 100 and the movable blade 200 cut the linerless label L.

Figure 3:
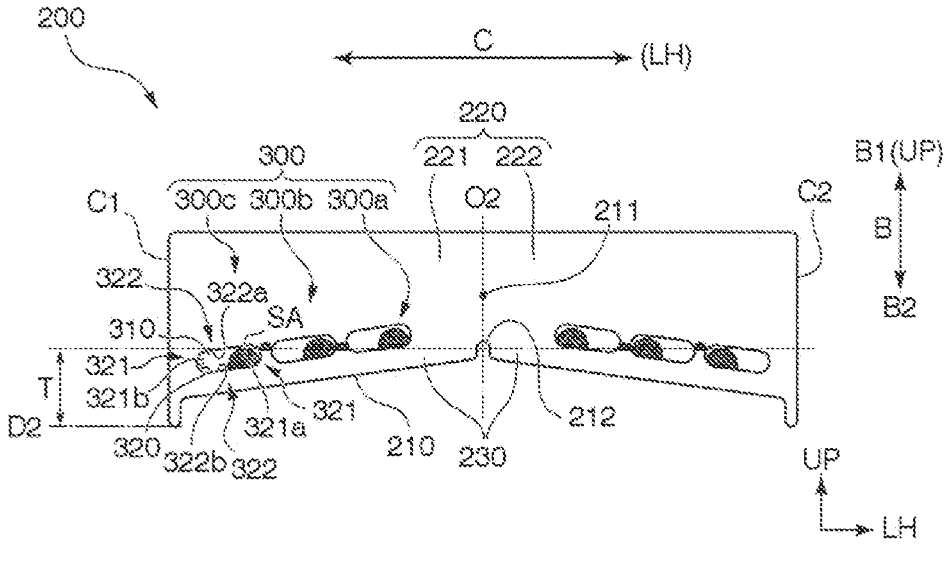
FIG. 3 is a front view for illustrating a movable blade of the thermal printer.
Figure 4A:
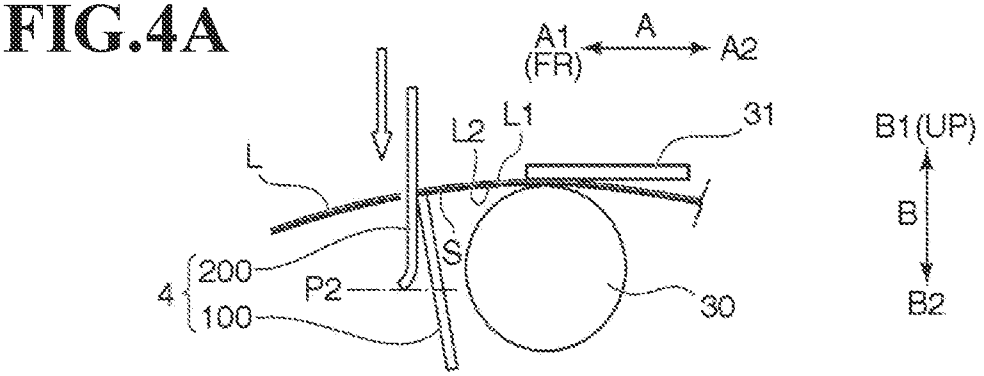
FIG. 4A, FIG. 4B, FIG. 4C, and FIG. 4D are views for illustrating a series of processes in which reciprocating motions of the movable blade of the thermal printer causes adhesion of an adhesive to a cutter unit, resulting in formation of an adhesive mass.
Figure 4B:
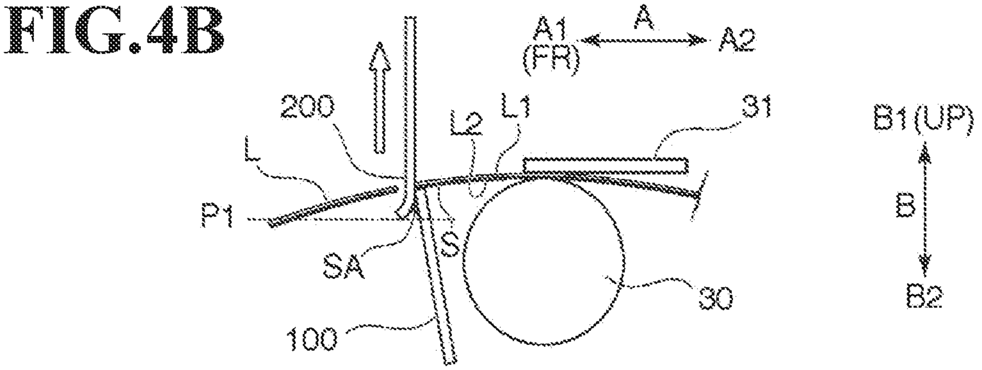
Figure 4C:
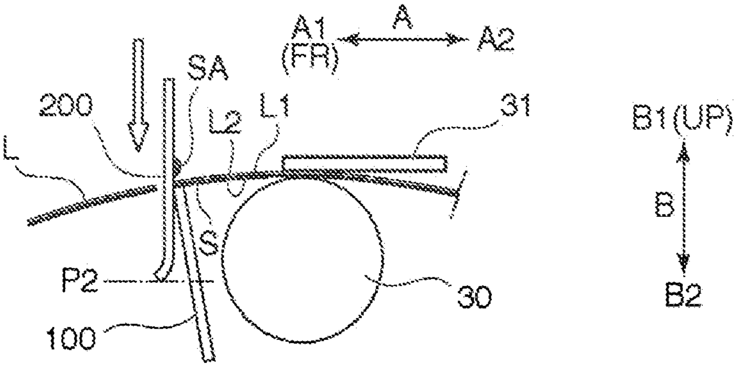
Figure 4D:
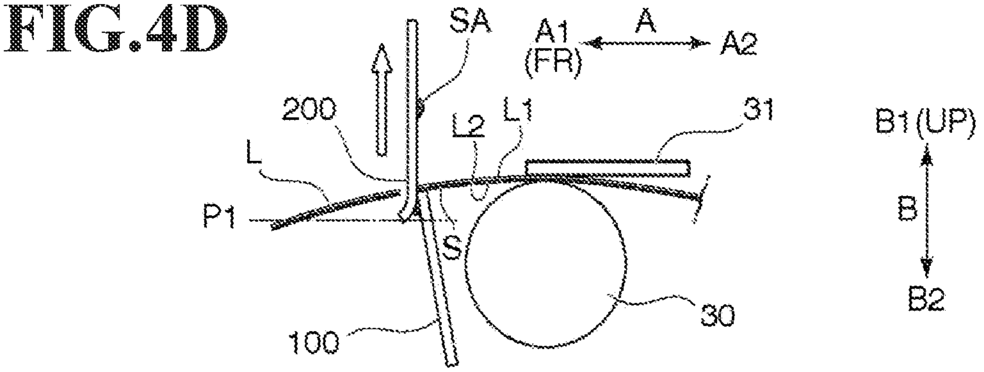

As illustrated in FIG. 2 and FIG. 3, the movable blade 200 is arranged between the thermal head 31 and the delivery slot 23 in the upper cover 21 and on the print surface L1 side being a front surface of the linerless label L. The movable blade 200 is formed into a plate-like shape extending in the width direction C. Further, the movable blade 200 is fixed through predetermined means by a support portion (not shown) provided in the housing 20. Moreover, the movable blade 200 reciprocates in the advancing direction B by the moving mechanism (not shown). As illustrated in FIG. 3, the movable blade 200 includes a first blade edge 210, a movable-blade back concave surface 220, and adhesive trap grooves 300 (grooves).

The moving mechanism (not shown) supports the movable blade 200, and reciprocates the movable blade 200 between a first position P1 and a second position P2. The first position P1 is a position of the first blade edge 210 of the movable blade 200 when the movable blade 200 is separated from the fixed blade 100 the farthest to the separation side B1 in the advancing direction B. The second position P2 is a position of the first blade edge 210 of the movable blade 200 when the movable blade 200 is moved to the cutting side B2 in the advancing direction B. In the cutter unit 4, when the first blade edge 210 of the movable blade 200 is at the second position P2, the fixed blade 100 and the movable blade 200 overlap each other when seen from the conveying direction A (see FIG. 5). A region over the movable-blade back concave surface 220 of the movable blade 200, which is sandwiched by the first blade edge 210 of the movable blade 200 at the second position P2 and the second blade edge 110 of the fixed blade 100 in the advancing direction B, is referred to as a "region T".

The first blade edge 210 is a blade edge of the movable blade 200 that forms a cut in the linerless label L. The first blade edge 210 is provided on the cutting side B2 of the movable blade 200 in the advancing direction B. The cutter unit 4 causes the moving mechanism (not shown) to move the movable blade 200 to the second position P2 side and slide the movable blade 200 while superposing the movable blade 200 on the fixed blade 100, thereby cutting the linerless label L between the first blade edge 210 and the second blade edge 110.

Moreover, as illustrated in FIG. 3, the first blade edge 210 of the movable blade 200 is formed into a V shape extending to the separation side B1 (toward a first direction) in the advancing direction B as extending from each end portion in the width direction C toward a center portion 211 of the first blade edge 210. In the center portion 211 of the first blade edge 210 of the movable blade 200 in the width direction C, a recessed portion 212 is formed to be recessed from the first blade edge 210 to the separation side B1 (toward the first direction). A bottom of the recessed portion 212 is configured so as to be prevented from coming into contact with the linerless label L when the cutter unit 4 cuts the linerless label L. With this configuration, when the cutter unit 4 cuts the linerless label L, an uncut portion is left at a portion of the linerless label L opposed to the recessed portion 212 (so-called partial cutting). In this embodiment, description is made of a configuration in which one recessed portion 212 is formed, and thus one uncut portion is left (one portion is uncut), but the present invention is not limited to this configuration. For example, a plurality of recessed portions 212 may be formed, and thus a plurality of uncut portions may be left (a plurality of portions are uncut). The recessed portion 212 is not an essential component.

The movable-blade back concave surface 220 is a surface arranged on the conveyance origin side A2 of the movable blade 200 in the conveying direction A so as to be opposed to the fixed blade 100. Further, a sliding surface 230 is formed in a part of the movable-blade back concave surface 220. Here, an axis on the movable-blade back concave surface 220, which passes the center portion 211 of the first blade edge 210 and is parallel to the advancing direction B, is referred to as a center axis O2. Moreover, a surface on a first end side C1 in the width direction C with respect to the center axis O2 of the movable-blade back concave surface 220 is referred to as a first surface 221. Further, a surface on a second end side C2 with respect to the center axis O2 of the movable-blade back concave surface 220 is referred to as a second surface 222. It is not always required that the center axis O2 be an axis that passes the center portion 211. It is only required that the center axis O2 be a symmetry axis about which the adhesive trap grooves 300 in the first surface 221 and the adhesive trap grooves 300 in the second surface 222 to be described later are arranged in a line-symmetrical manner.

The sliding surface 230 is a part of the movable-blade back concave surface 220 that overlaps the region T when seen from the conveying direction A.

The adhesive trap grooves 300 are each an oval-shaped groove that does not pass through a surface of the movable blade 200 (not shown) opposite to the movable-blade back concave surface, and are formed in the movable-blade back concave surface 220. Each of the adhesive trap grooves 300 includes a groove opening portion 310 in the movable-blade back concave surface 220, and includes an edge portion 320 along a rim thereof. A depth of each of the adhesive trap grooves 300 can be set as appropriate within a range in which the adhesive trap groove 300 does not pass through the surface opposite to the movable-blade back concave surface. Further, it is desired that each of the adhesive trap grooves 300 have a size large enough to accumulate an adhesive mass SA to be described later until the thermal printer 1 reaches the end of its lifetime.

As illustrated in FIG. 3, the edge portion 320 is a rim of the adhesive trap groove 300. The edge portion 320 includes an adhesive blocking edge portion 321 and an adhesive scraping edge portion 322.

The adhesive blocking edge portion 321 is an edge of the adhesive trap groove 300 formed along the advancing direction B. The adhesive blocking edge portion 321 includes an edge extending in a direction parallel to the advancing direction B, and an edge that does not extend in parallel to the advancing direction B but extends so as to cross the advancing direction B at a crossing angle of about 45 degrees or less. Further, the adhesive blocking edge portion 321 includes a first adhesive blocking edge portion 321*a* and a second adhesive blocking edge portion 321*b*.

The first adhesive blocking edge portion 321*a* is an edge having the groove opening portion 310 on each end portion side of the movable blade 200, and restrains the adhesive mass SA to be described later from moving to the center axis O2 side.

The second adhesive blocking edge portion 321*b* is an edge having the groove opening portion 310 on the center axis O2 side, and restrains the adhesive mass SA from moving from the center axis O2 to each end portion side of the movable blade 200 in the width direction C.

The first adhesive blocking edge portion 321*a* is formed on the first surface 221 on the first end side C1 of the movable blade 200 with respect to the center axis O2. The first adhesive blocking edge portion 321*a* is formed on the sliding surface 230, and thus can restrain the adhesive mass SA from moving to the center axis O2 side owing to operations of the cutter unit 4 of the thermal printer 1 to be described later. It is only required that at least one first adhesive blocking edge portion 321*a* be formed on the sliding surface 230. Further, the adhesive blocking edge portion 321 can be set as appropriate in accordance with a shape of the blade edge and a movement location of the adhesive mass SA. Further, the adhesive trap groove 300 may include a plurality of adhesive blocking edge portions 321.

The adhesive scraping edge portion 322 is an edge that crosses the advancing direction B and is formed in the adhesive trap groove 300. The adhesive scraping edge portion 322 includes an edge extending in a direction parallel to the width direction C, and an edge that does not extend in parallel to the width direction C but extends so as to cross the width direction C at a crossing angle of about 45 degrees or less. Further, the adhesive scraping edge portion 322 includes a first adhesive scraping edge portion 322*a* and a second adhesive scraping edge portion 322*b*.

The first adhesive scraping edge portion 322*a* is an edge having the groove opening portion 310 on the cutting side B2 in the advancing direction B, and has a function of scraping an adhesive S adhering to the movable blade 200 when the movable blade 200 is moved from the second position P2 to the first position P1.

The second adhesive scraping edge portion 322*b* is an edge having the groove opening portion 310 on the separation side B1 in the advancing direction B, and has a function of scraping the adhesive S adhering to the movable blade 200 when the movable blade 200 is moved from the first position P1 to the second position P2. On the first surface 221, at least one first adhesive scraping edge portion 322*a* is formed on the sliding surface 230. The adhesive trap groove 300 may include a plurality of adhesive scraping edge portions 322.

The adhesive trap groove 300 includes one first adhesive blocking edge portion 321*a*, one second adhesive blocking edge portion 321*b*, one first adhesive scraping edge portion 322*a*, and one second adhesive scraping edge portion 322*b*. The first adhesive blocking edge portion 321*a*, the second adhesive blocking edge portion 321*b*, the first adhesive scraping edge portion 322*a*, and the second adhesive scraping edge portion 322*b* are coupled to each other. Three adhesive trap grooves 300 having substantially the same size are formed in the first surface 221. In the following description, the three adhesive trap grooves 300 are distinguished as a first adhesive trap groove 300*a*, a second adhesive trap groove 300*b*, and a third adhesive trap groove 300*c*. The adhesive trap grooves 300 formed in the second surface 222, which is symmetrical to the first surface 221 about the center axis O2, are arranged so as to be line-symmetrical about the center axis O2 to the adhesive trap grooves 300 formed in the first surface 221, and hence description thereof is omitted.

In the first surface 221, the first adhesive trap groove 300*a* is formed on the center axis O2 side. The third adhesive trap groove 300*c* is formed on the first end side C1 of the first surface 221 of the movable blade 200. The second adhesive trap groove 300*b* is formed between the first adhesive trap groove 300*a* and the third adhesive trap groove 300*c*. In the first surface 221, the adhesive trap grooves 300 are arrayed at equal intervals in the width direction C. With regard to the first adhesive trap groove 300*a*, the second adhesive trap groove 300*b*, and the third adhesive trap groove 300*c*, the number and sizes of the adhesive trap grooves 300 are not particularly limited, and are selected as appropriate in accordance with types of the thermal printer 1 and sizes of the movable blade 200.

[Linerless Label L]

As illustrated in FIG. 2, the linerless label L is a recording sheet to be used for printing by the thermal printer 1. A front surface of the linerless label L forms the print surface L1, and a back surface of the linerless label L on the cutting side B2 forms the pressure-sensitive adhesive surface L2 to which the adhesive S is applied. The print surface L1 is covered with a peeling layer (such as a silicon coating). Under a state in which the print surface L1 faces the separation side B1 and the pressure-sensitive adhesive surface L2 faces the cutting side B2 in the advancing direction B, the linerless label L is wound around a tubular core member R1, thereby forming a roll portion R. The roll portion R may have a configuration without the core member R1. A leading edge portion LA of the linerless label L is drawn to the conveyance destination side A1, and is inserted between the thermal head 31 and the platen roller 30. The roll portion R is located on the conveyance origin side A2 in the housing 20. When the upper cover 21 is in the opening position, the roll portion R is removed and loaded through the upper-end opening portion 20*a* of the housing 20.

Due to reciprocating motions of the movable blade 200 of the cutter unit 4, the adhesive S applied to the pressure-sensitive adhesive surface L2 of the linerless label L is peeled away and then adheres to the cutter unit 4, thereby forming the adhesive mass SA.

As illustrated in FIGS. 4, due to the reciprocating motions of the movable blade 200 of the cutter unit 4, the adhesive S adheres to the cutter unit 4, and thus the adhesive mass SA is formed. First, in FIG. 4A, the movable blade 200 is first moved along the advancing direction B from the first position P1 to the second position P2. Then, the movable blade 200 forms a cut in the linerless label L between the fixed blade 100 and the movable blade 200, and moves the adhesive S on the pressure-sensitive adhesive surface L2 of the linerless label L and thus peels the adhesive S away from the linerless label L. The adhesive S peeled away from the linerless label L adheres to the movable blade 200 and the fixed blade 100, and forms the adhesive mass SA. Next, in FIG. 4B, the movable blade 200 is moved along the advancing direction B from the second position P2 to the first position P1 so as to reciprocate between the first position P1 and the second position P2 (a first reciprocating motion). The adhesive mass SA formed at this time is moved by the movable blade 200 to a vicinity of the second blade edge 110 of the fixed blade 100. Next, in FIG. 4C, the movable blade 200 is moved along the advancing direction B from the first position P1 to the second position P2 again. Then, the adhesive mass SA adhering to the vicinity of the second blade edge 110 of the fixed blade 100 is moved and sticks to the movable blade 200 that has approached the adhesive mass SA. Next, in FIG. 4D, the movable blade 200 is moved along the advancing direction B from the second position P2 to the first position P1 so as to reciprocate between the first position P1 and the second position P2 (a second reciprocating motion). The movable blade 200 and the fixed blade 100 are slid on each other, and thus the adhesive mass SA that has stuck to the movable blade 200 is pushed toward the movable blade 200. When the movable blade 200 makes a series of motions including the above-mentioned first reciprocating motion and second reciprocating motion a predetermined number of times, the adhesive mass SA adheres to the movable blade 200 and accumulates on the movable blade 200 gradually while the adhesive mass SA is deformed or a plurality of adhesive masses SA are formed.

[Operations]

Next, operations of the above-mentioned cutter unit 4 of the thermal printer 1 are described with reference to FIG. 5 and FIG. 6.

Figure 5:
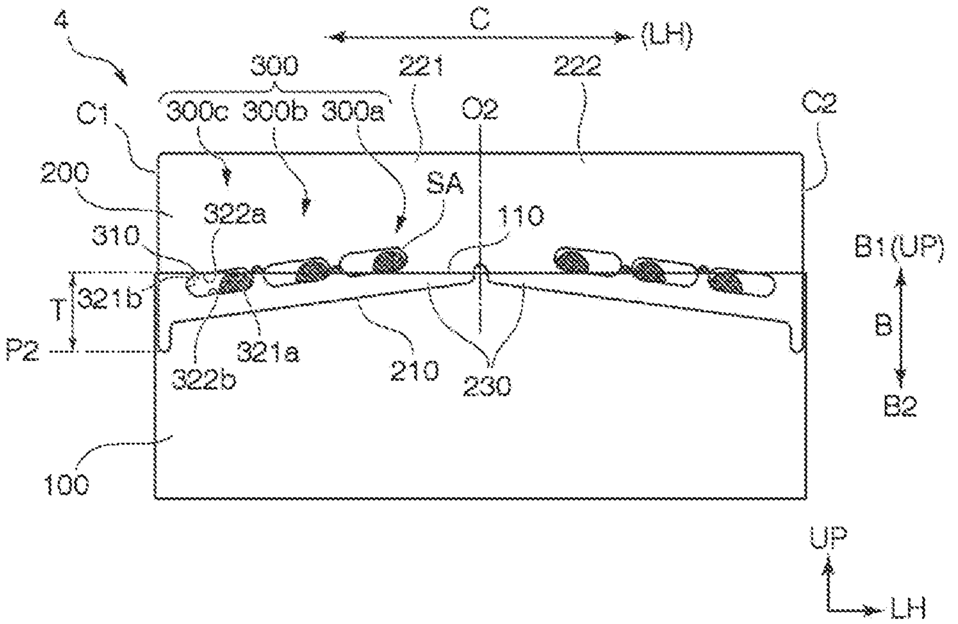
FIG. 5 is a view for illustrating a state in which the movable blade of the thermal printer is brought close to a fixed blade and reaches a second position P2.

FIG. 5 is a view for illustrating a state in which the movable blade 200 of the thermal printer 1 is brought close to the fixed blade 100 and reaches the second position P2. As described above, in FIGS. 4, when the movable blade 200 makes the series of motions including the first reciprocating motion and the second reciprocating motion a plurality of times, the adhesive mass SA adheres to the movable blade 200. When the movable blade 200 is brought close to the fixed blade 100 so as to be moved to the second position P2, the adhesive mass SA adhering to the movable blade 200 is scraped from the movable blade 200 by the first adhesive scraping edge portion 322*a* or the second adhesive scraping edge portion 322*b* of each of the first adhesive trap groove 300*a*, the second adhesive trap groove 300*b*, and the third adhesive trap groove 300*c*, and then is dropped into the adhesive trap groove 300. At this time, a frictional force is applied to the adhesive mass SA to the cutting side B2 and in a direction along the adhesive scraping edge portion 322 that is formed so as to be substantially parallel to the first blade edge 210. The force is applied to the adhesive mass SA to the cutting side B2, and the force is also applied to the adhesive mass SA so as to move the adhesive mass SA along the adhesive scraping edge portion 322 to the center axis O2 side in the adhesive trap groove 300. Each first adhesive scraping edge portion 322*a* restrains the adhesive mass SA dropped into the adhesive trap groove 300 from moving in the advancing direction B. Further, each first adhesive blocking edge portion 321*a* restrains the adhesive mass SA from moving to the center axis O2 side. As illustrated in FIG. 5, in each adhesive trap groove 300, the adhesive mass SA accumulates on the cutting side B2 and on the center axis O2 side of the adhesive trap groove 300.

Figure 6:
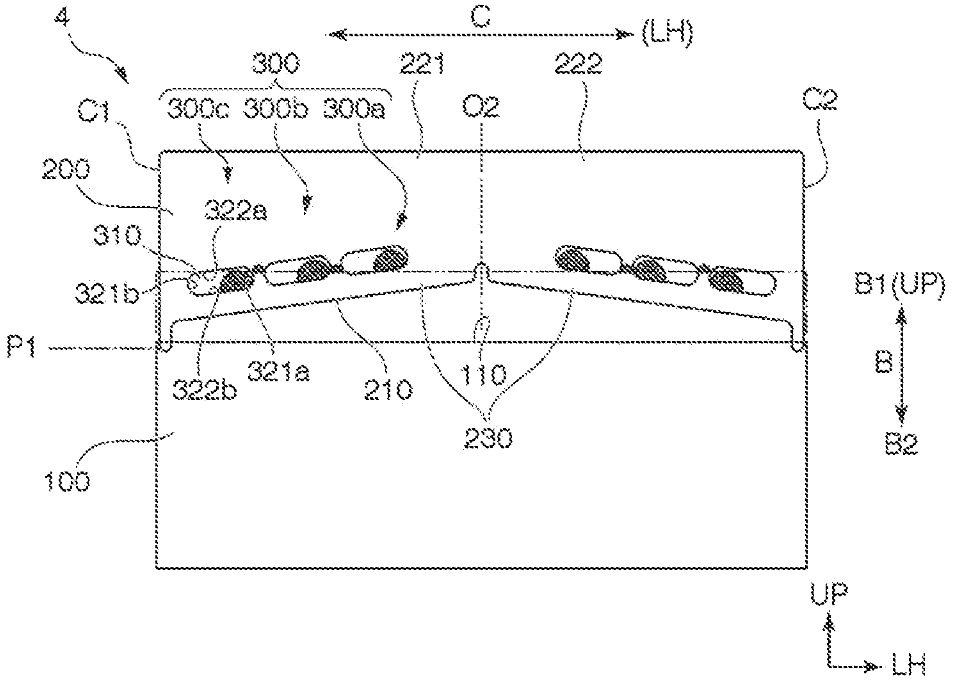
FIG. 6 is a view for illustrating a state in which the movable blade of the thermal printer is separated away from the fixed blade and reaches a first position P1.

FIG. 6 is a view for illustrating a state in which the movable blade 200 of the thermal printer 1 is separated away from the fixed blade 100 and reaches the first position P1. In FIG. 6, when the movable blade 200 is separated away from the fixed blade 100 and is moved to the first position P1, the adhesive mass SA dropped into the adhesive trap groove 300 is slid on the fixed-blade back concave surface 120 of the fixed blade 100. At this time, a frictional force is applied to the adhesive mass SA to the cutting side B2 and in a direction along the second adhesive scraping edge portion 322*b* that is formed so as to be substantially parallel to the first blade edge 210. The force is applied to the adhesive mass SA to the separation side B1, and the force is also applied to the adhesive mass SA so as to move the adhesive mass SA along the second adhesive scraping edge portion 322*b* to the first end side C1 in the adhesive trap groove 300. Each second adhesive scraping edge portion 322*b* restrains the adhesive mass SA dropped into the adhesive trap groove 300 from moving in the advancing direction B. Further, each second adhesive blocking edge portion 321*b* restrains the adhesive mass SA from moving to the first end side C1 of the movable blade 200.

In this embodiment, as illustrated in FIG. 5, the adhesive mass SA is pushed into the adhesive trap groove 300 to the conveyance destination side A1 in the conveying direction A when the adhesive mass SA is scraped. Accordingly, as illustrated in FIG. 6, when the movable blade 200 is separated away from the fixed blade 100 and reaches the first position P1, the adhesive mass SA dropped into the adhesive trap groove 300 does not move from a position illustrated in FIG. 5 even when the force is applied to the separation side B1 and the first end side C1. However, the position of the adhesive mass SA is not particularly limited. The adhesive mass SA may move in a direction of application of the force.

In this embodiment, each of the first adhesive trap groove 300*a*, the second adhesive trap groove 300*b*, and the third adhesive trap groove 300*c* formed in the sliding surface 230 includes the first adhesive blocking edge portion 321*a* and the second adhesive blocking edge portion 321*b*, and hence restrains the adhesive mass SA from moving to the center axis O2 side or the first end side C1. Thus, the adhesive trap groove 300 can accumulate the adhesive mass SA.

Further, in this embodiment, each first adhesive scraping edge portion 322*a* or each second adhesive scraping edge portion 322*b* scrapes the adhesive mass SA adhering to the fixed blade 100 and the movable blade 200 into the adhesive trap groove 300. Accordingly, cutting failure of the cutter unit 4, which is caused by an influence of adhesion of the adhesive mass SA, is solved, thereby being capable of reducing a sliding load on a blade.

Further, in this embodiment, the trap grooves can accumulate the adhesive masses SA equally for a long period of time. Accordingly, without checking an accumulation level of the adhesive masses SA, maintenance work can be reduced.

Further, in this embodiment, there is no need to remove the adhesive masses SA, thereby being capable of eliminating a risk in that a hand is wounded by, for example, a blade of the cutter unit.

As described above, the thermal printer 1 according to this embodiment can reduce the adhesive removal work by efficiently accumulating the adhesive in the groove formed in the blade until the printer reaches the end of its lifetime.

The present invention is not limited by the one embodiment described above. Further, the components in the one embodiment encompass components easily conceived by a person skilled in the art, or substantially the same components, that is, so-called equivalents. In addition, the components disclosed in the one embodiment can be combined with each other as appropriate.

Hereinabove, the one embodiment of the present invention has been described in detail with reference to the accompanying drawings. However, specific structures of the present invention are not limited to the one embodiment and encompass design modifications and the like without departing from the gist of the present invention. Further, the components described in the one embodiment described above and modification examples described below may be configured in combination with each other as appropriate.

MODIFICATION EXAMPLES

Modification Examples of the adhesive trap grooves 300 of the movable blade 200 in this embodiment are described with reference to FIG. 7 to FIG. 11. In Modification Examples of the adhesive trap grooves 300 illustrated in FIG. 7, FIG. 8, FIG. 9, and FIG. 10, the adhesive trap grooves 300 formed in the second surface 222 are line-symmetrical about the center axis O2 to the adhesive trap grooves 300 formed in the first surface 221, and hence description thereof is omitted.

Modification Example 1

Figure 7:
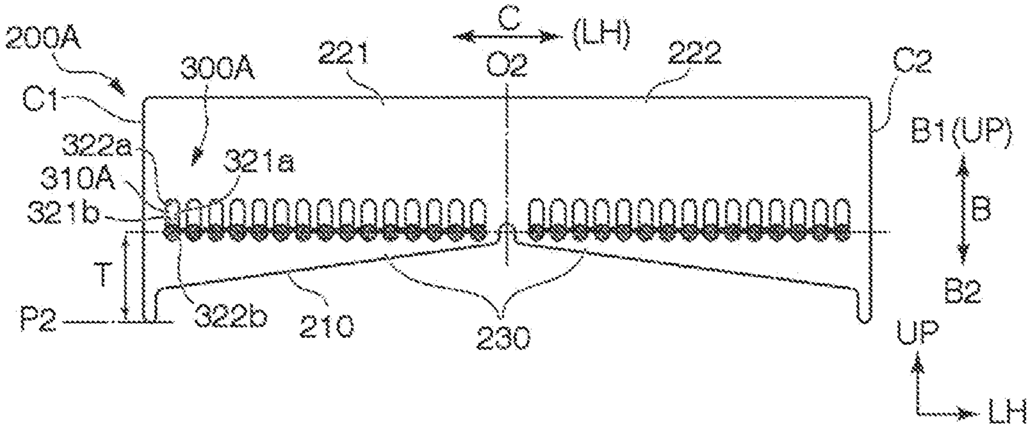
FIG. 7 is an explanatory view for illustrating a modification example of the cutter unit of the thermal printer according to the embodiment described above.

As illustrated in FIG. 7, in a movable blade 200A, a plurality of adhesive trap grooves 300A having substantially the same size are formed in the first surface 221 corresponding to a half of a surface of the movable blade with respect to the center axis O2, and are arranged at equal intervals in the width direction C. Similarly to the adhesive trap grooves in this embodiment, each of the adhesive trap grooves 300A includes the first adhesive blocking edge portion 321*a*, the second adhesive blocking edge portion 321*b*, the first adhesive scraping edge portion 322*a*, and the second adhesive scraping edge portion 322*b* that are coupled to each other, forming a groove opening portion 310A. The first adhesive scraping edge portion 322*a* and the second adhesive scraping edge portion 322*b* are formed along the width direction C orthogonal to the advancing direction B. Each second adhesive scraping edge portion 322*b* is formed on the sliding surface 230. Each second adhesive scraping edge portion 322*b* corresponds to a lower end of the adhesive trap groove 300A, and the second adhesive scraping edge portions 322*b* are arranged in a straight line along the width direction C. Each first adhesive scraping edge portion 322*a* corresponds to an upper end of the adhesive trap groove 300A, and the first adhesive scraping edge portions 322*a* are arranged in a straight line along the width direction C.

As illustrated in FIGS. 4, when the movable blade 200A makes the reciprocating motions, the adhesive mass SA is scraped from the movable blade 200A by each second adhesive scraping edge portion 322*b* formed on the sliding surface 230, and then is dropped into the adhesive trap groove 300A. The first adhesive scraping edge portion 322*a* and the second adhesive scraping edge portion 322*b* are formed along the width direction C orthogonal to the advancing direction B, and thus a frictional force is applied to the adhesive mass SA only to the separation side B1. The first adhesive scraping edge portion 322*a* and the second adhesive scraping edge portion 322*b* can restrain the adhesive mass SA dropped into the adhesive trap groove 300A from moving in the advancing direction B. Also in this case, each adhesive trap groove 300A can accumulate the adhesive mass SA equally in the adhesive trap groove 300A.

Modification Example 2

Figure 8:
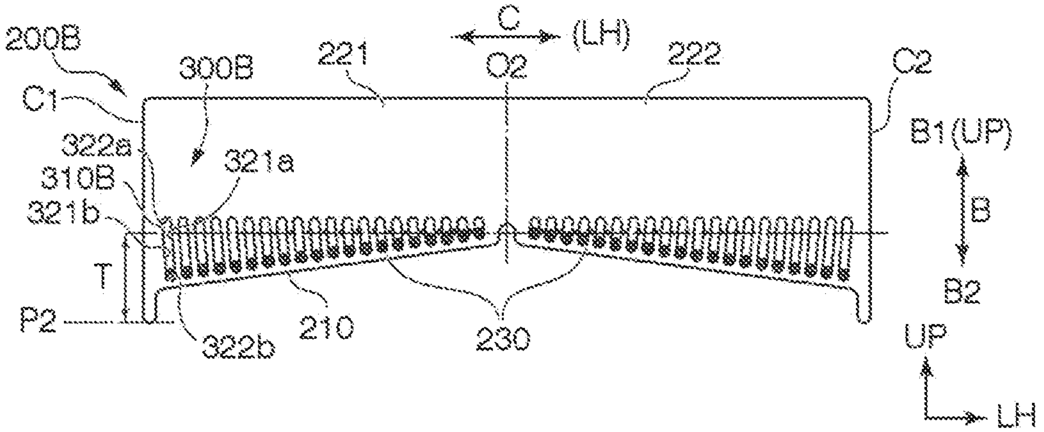
FIG. 8 is an explanatory view for illustrating a modification example of the cutter unit of the thermal printer according to the embodiment described above.

Next, as illustrated in FIG. 8, in a movable blade 200B, a plurality of adhesive trap grooves 300B having different sizes are formed in the first surface 221 corresponding to a half of a surface of the movable blade with respect to the center axis O2, and are arranged at equal intervals in the width direction C. Similarly to the adhesive trap grooves in this embodiment, each of the adhesive trap grooves 300B includes the first adhesive blocking edge portion 321*a*, the second adhesive blocking edge portion 321*b*, the first adhesive scraping edge portion 322*a*, and the second adhesive scraping edge portion 322*b* that are coupled to each other, forming a groove opening portion 310B. Each first adhesive blocking edge portion 321*a* and second adhesive scraping edge portion 322*b* are formed on the sliding surface 230. Each second adhesive scraping edge portion 322*b* corresponds to a lower end of the adhesive trap groove 300B, and the second adhesive scraping edge portions 322*b* are arranged in substantially parallel to the blade edge 210 of the movable blade 200B. Each first adhesive scraping edge portion 322*a* corresponds to an upper end of the adhesive trap groove 300B, and the first adhesive scraping edge portions 322*a* are arranged in a straight line along the width direction C.

As illustrated in FIGS. 4, when the movable blade 200B makes the reciprocating motions, the adhesive mass SA is scraped from the movable blade 200B by each second adhesive scraping edge portion 322*b* formed on the sliding surface 230, and then is dropped into the adhesive trap groove 300B. The second adhesive scraping edge portion 322*b* is formed so as to be substantially parallel to the first blade edge 210 of the movable blade 200B. Thus, a frictional force is applied to the adhesive mass SA to the cutting side B2, and the force is also applied to the adhesive mass SA so as to move the adhesive mass SA along the second adhesive scraping edge portion 322*b* to the center axis O2 side in the adhesive trap groove 300B. Each first adhesive scraping edge portion 322*a* restrains the adhesive mass SA dropped into the adhesive trap groove 300B from moving in the advancing direction B. Further, each first adhesive blocking edge portion 321*a* restrains the adhesive mass SA from moving to the center axis O2 side. Also in this case, each adhesive trap groove 300B can accumulate the adhesive mass SA equally in the adhesive trap groove 300B.

Modification Example 3

Figure 9:
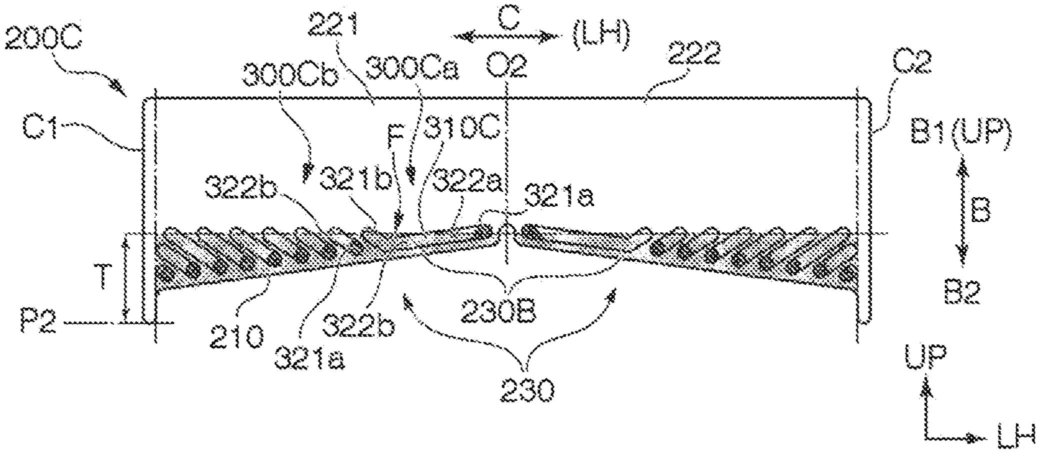
FIG. 9 is an explanatory view for illustrating a modification example of the cutter unit of the thermal printer according to the embodiment described above.

Next, as illustrated in FIG. 9, in a movable blade 200C, an adhesive trap groove 300Ca and adhesive trap grooves 300Cb having different sizes are formed in the first surface 221 corresponding to a half of a surface of the movable blade with respect to the center axis O2, and are arranged in the width direction C. The adhesive trap groove 300Ca arranged on the center axis O2 side includes the first adhesive blocking edge portion 321*a*, the second adhesive blocking edge portion 321*b*, the first adhesive scraping edge portion 322*a*, and the second adhesive scraping edge portion 322*b* that are coupled to each other, forming a groove opening portion 310C. The first adhesive scraping edge portion 322*a* of the adhesive trap groove 300Ca extends along the first blade edge 210 in the width direction C to a vicinity of a center of the first surface 221, and includes a bent portion F at a halfway portion thereof. The second adhesive scraping edge portion 322*b* is formed into a shape along the above-mentioned first adhesive scraping edge portion 322*a*. The plurality of adhesive trap grooves 300Cb are formed in the first surface 221 of the movable blade 200C more on the first end side C1 than the adhesive trap groove 300Ca. The first adhesive blocking edge portion 321*a* of each of the adhesive trap grooves 300Cb is arranged on the cutting side B2 of each of the adhesive trap grooves 300Cb, and the first adhesive blocking edge portions 321*a* are arranged in a straight line and in substantially parallel to the blade edge of the movable blade 200C. Further, the second adhesive scraping edge portion 322*b* of each of the adhesive trap grooves 300Cb is arranged on the separation side B1 of each of the adhesive trap grooves 300Cb, and the second adhesive scraping edge portions 322*b* are arranged in a straight line and in parallel to the width direction C. Further, the first adhesive scraping edge portion 322*a* and the second adhesive scraping edge portion 322*b* are formed to have such an angle as to be symmetrical to an angle of the blade edge about the width direction C. The first adhesive blocking edge portions 321*a* of the adhesive trap groove 300Ca and the adhesive trap grooves 300Cb are formed on the sliding surface 230. At least parts of the first adhesive scraping edge portions 322*a* of the adhesive trap groove 300Ca and the adhesive trap grooves 300Cb are also formed on the sliding surface 230. Moreover, the adhesive trap groove 300Ca and the adhesive trap groove 300Cb adjacent to each other in the advancing direction B, or the adhesive trap grooves 300Cb adjacent to each other in the advancing direction B are arranged on the same straight line when the movable blade 200C makes the reciprocating motions. Further, in a region 230B being a part of the sliding surface 230, which extends along the advancing direction B and is defined by a width of the linerless label L, the adhesive trap groove 300Ca or the adhesive trap grooves 300Cb are formed across an entire region of the sliding surface 230 in the width direction C.

As illustrated in FIGS. 4, when the movable blade 200C makes the reciprocating motions, the adhesive mass SA is scraped from the movable blade 200C by each second adhesive scraping edge portion 322*b* formed on the sliding surface 230, and then is dropped into the adhesive trap groove 300Ca or the adhesive trap groove 300Cb. Further, each first adhesive scraping edge portion 322*a* and each second adhesive scraping edge portion 322*b* restrain the adhesive mass SA dropped into the adhesive trap groove 300Ca or the adhesive trap groove 300Cb from moving in the advancing direction B. Moreover, each first adhesive blocking edge portion 321*a* restrains the adhesive mass SA from moving to the center axis O2 side. Also in this case, as illustrated in FIG. 9, the adhesive trap grooves 300Ca or the adhesive trap grooves 300Cb can accumulate the adhesive masses SA equally. Further, the adhesive trap grooves 300Ca or the adhesive trap grooves 300Cb are formed in the region 230B. Thus, the adhesive trap groove 300Ca and the adhesive trap groove 300Cb adjacent to each other in the advancing direction B, or the adhesive trap grooves 300Cb adjacent to each other in the advancing direction B can efficiently scrape the adhesive mass SA from the cutter unit 4 when the movable blade 200C makes the reciprocating motions.

Modification Example 4

Figure 10:
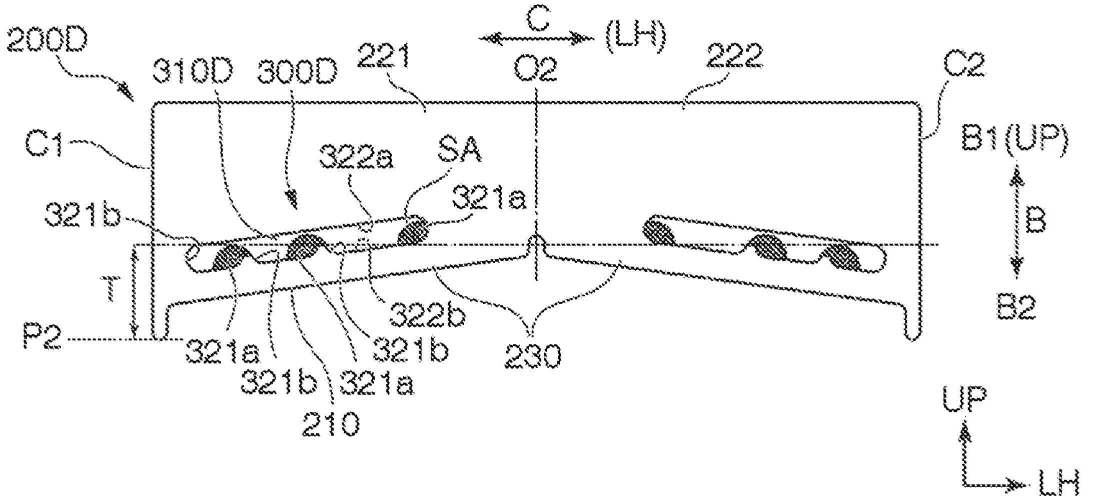
FIG. 10 is an explanatory view for illustrating a modification example of the cutter unit of the thermal printer according to the embodiment described above.

Next, as illustrated in FIG. 10, in a movable blade 200D, one adhesive trap groove 300D is formed in the first surface 221 corresponding to a half of a surface of the movable blade with respect to the center axis O2. Similarly to the adhesive trap grooves in this embodiment, the adhesive trap groove 300D includes the first adhesive blocking edge portions 321*a*, the second adhesive blocking edge portions 321*b*, the first adhesive scraping edge portion 322*a*, and the second adhesive scraping edge portion 322*b* that are coupled to each other, forming a groove opening portion 310D. The first adhesive blocking edge portions 321*a* and the second adhesive blocking edge portions 321*b* are formed on the sliding surface 230. At least three first adhesive blocking edge portions 321*a* and at least three second adhesive blocking edge portions 321*b* are formed on the sliding surface 230 in the adhesive trap groove 300D. The first adhesive scraping edge portion 322*a* and the second adhesive scraping edge portion 322*b* are formed so as to be substantially parallel to the first blade edge 210 of the movable blade 200D.

As illustrated in FIGS. 4, when the movable blade 200D makes the reciprocating motions, the adhesive mass SA is scraped from the movable blade 200D by the second adhesive scraping edge portion 322*b*, and then is dropped into the adhesive trap groove 300D. The first adhesive scraping edge portion 322*a* and the second adhesive scraping edge portion 322*b* are formed so as to be substantially parallel to the first blade edge 210 of the movable blade 200D. Thus, a frictional force is applied to the adhesive mass SA to the cutting side B2, and the force is also applied to the adhesive mass SA so as to move the adhesive mass SA along the second adhesive scraping edge portion 322*b* to the center axis O2 side in the adhesive trap groove 300D. The first adhesive scraping edge portion 322*a* restrains the adhesive mass SA dropped into the adhesive trap groove 300D from moving in the advancing direction B. Further, each first adhesive blocking edge portion 321*a* restrains the adhesive mass SA from moving to the center axis O2 side. Also in this case, each adhesive trap groove 300D can accumulate the adhesive mass SA equally in the adhesive trap groove 300D.

Modification Example 5

Figure 11:
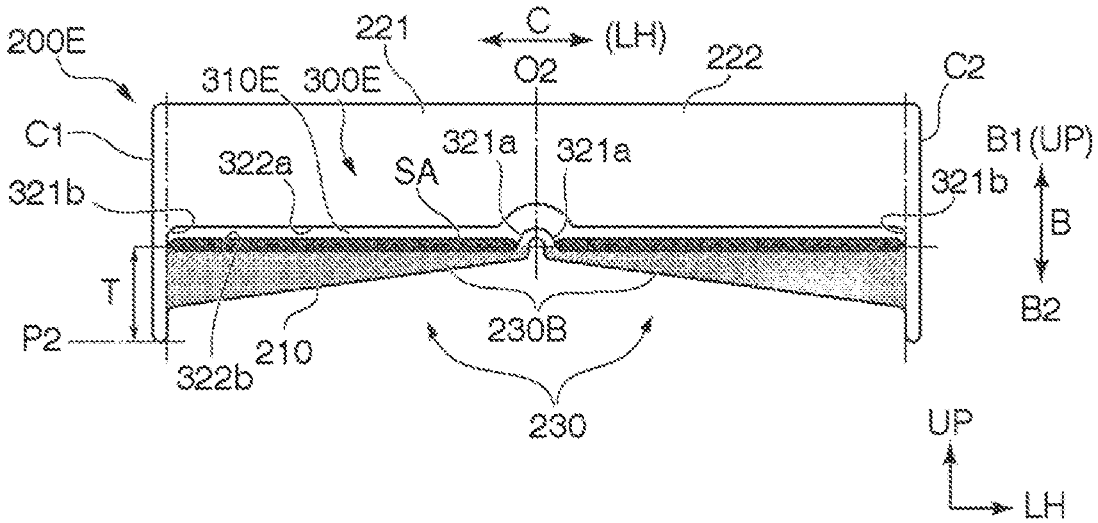
FIG. 11 is an explanatory view for illustrating a modification example of the cutter unit of the thermal printer according to the embodiment described above.

Next, as illustrated in FIG. 11, in a movable blade 200E, one adhesive trap groove 300E is formed in the movable-blade back concave surface 220. Similarly to the adhesive trap grooves in this embodiment, the adhesive trap groove 300E includes the first adhesive blocking edge portions 321*a*, the second adhesive blocking edge portions 321*b*, the first adhesive scraping edge portion 322*a*, and the second adhesive scraping edge portion 322*b* that are coupled to each other, forming a groove opening portion 310E. Further, a region being a partial region of the sliding surface 230 is referred to as the region 230B. The region 230B extends along the advancing direction B, is defined by the width of the linerless label L, and is arranged on the cutting side B2 in the advancing direction B. The adhesive trap groove 300E overlaps the region 230B, and is formed across the entire region of the sliding surface 230 in the width direction C. The first adhesive scraping edge portion 322*a* corresponds to an upper end of the adhesive trap groove 300E, and is arranged in a straight line along the width direction C. The second adhesive scraping edge portion 322*b* corresponds to a lower end of the adhesive trap groove 300E, and is arranged in a straight line along the width direction C. The second adhesive scraping edge portion 322*b* overlaps the region 230B of the sliding surface 230. No first adhesive blocking edge portion 321*a* and no second adhesive blocking edge portion 321*b* may be formed on the sliding surface 230.

As illustrated in FIGS. 4, when the movable blade 200E makes the reciprocating motions, the adhesive mass SA is scraped from the movable blade 200E by the second adhesive scraping edge portion 322*b*, and then is dropped into the adhesive trap groove 300E. The first adhesive scraping edge portion 322*a* and the second adhesive scraping edge portion 322*b* are formed so as to extend along the width direction C orthogonal to the advancing direction B. Thus, a frictional force is applied to the adhesive mass SA only to the separation side B1. The first adhesive scraping edge portion 322*a* and the second adhesive scraping edge portion 322*b* can restrain the adhesive mass SA dropped into the adhesive trap groove 300E from moving in the advancing direction B. Further, the adhesive trap groove 300E is formed in the region 230B, and thus the adhesive mass SA can be efficiently scraped from the cutter unit 4. Also in this case, the adhesive trap groove 300E can accumulate the adhesive masses SA equally in the adhesive trap groove 300E.

In any mode described above, the thermal printer according to the present invention can lessen a burden of maintenance, for example, reduce the adhesive removal work by efficiently accumulating an adhesive in a groove formed in a blade until the printer reaches the end of its lifetime.

What is claimed is:

1. A thermal printer configured to perform printing on a linerless label including an adhesive surface formed on a back surface of the linerless label, the thermal printer comprising a cutter unit that includes:

a fixed blade provided on the back surface side of the linerless label; and a movable blade configured to reciprocate between a first position at which the movable blade is opposed to the fixed blade through intermediation of the linerless label, and a second position at which at least a part of the movable blade overlaps the fixed blade and the movable blade forms a cut in the linerless label, wherein the movable blade includes:

a first blade edge configured to form the cut in the linerless label; and a groove, which has an edge, and is formed in a sliding surface configured to slide on the fixed blade when the movable blade is at the second position, and wherein the edge includes:

an adhesive blocking edge portion formed on the sliding surface along an advancing direction; and an adhesive scraping edge portion formed on the sliding surface so as to cross the advancing direction.

2. The thermal printer according to claim 1, wherein the first blade edge is formed on the second position side in the advancing direction, and is formed into a V shape extending toward a center portion of the movable blade.

3. The thermal printer according to claim 1, wherein the adhesive blocking edge portion comprises at least three adhesive blocking edge portions formed in the groove.

4. The thermal printer according to claim 1, wherein the adhesive scraping edge portion of the groove is formed on the sliding surface so as to be parallel to the first blade edge.

5. The thermal printer according to claim 1, wherein the adhesive scraping edge portion of the groove is formed on the sliding surface so as to cross the advancing direction.

6. The thermal printer according to claim 1, wherein the movable blade includes at least one groove formed in the sliding surface, and wherein the groove is arranged in a line-symmetrical manner about a symmetry axis parallel to the advancing direction.

7. The thermal printer according to claim 1, wherein the movable blade includes a plurality of grooves formed in the sliding surface, and wherein the plurality of grooves adjacent to each other are arranged so as to overlap each other in the advancing direction.

8. The thermal printer according to claim 1, wherein in a region of the sliding surface, which is defined by a width of the linerless label, at least one groove is formed across an entire region of the sliding surface in a width direction perpendicular to the advancing direction.

* * * * *